(12) United States Patent
Kesil et al.

(10) Patent No.: US 6,801,044 B2
(45) Date of Patent: Oct. 5, 2004

(54) UNIVERSAL ELECTROMAGNETIC RESONANCE SYSTEM FOR DETECTING AND MEASURING LOCAL NON-UNIFORMITIES IN METAL AND NON-METAL OBJECTS

(76) Inventors: Boris Kesil, 5141 Ishimatsu Pl., San Jose, CA (US) 95124; Leonid Velikov, 1371 Greenbrier Rd., San Carlos, CA (US) 94070; Yuri Vorobyev, 1371 Greenbrier Rd., San Carlos, CA (US) 94070

( * ) Notice: Subject to any disclaimer, the term of this patent is extended or adjusted under 35 U.S.C. 154(b) by 0 days.

(21) Appl. No.: 10/654,759

(22) Filed: Sep. 5, 2003

(65) Prior Publication Data

US 2004/0155667 A1 Aug. 12, 2004

Related U.S. Application Data

(63) Continuation of application No. 10/359,378, filed on Feb. 7, 2003.

(51) Int. Cl.$^7$ .............................................. G01R 27/26
(52) U.S. Cl. ..................................... 324/663; 324/662
(58) Field of Search ............................... 324/663, 658, 324/649, 600, 633, 71.1, 652, 654, 668, 76.51, 662; 331/44, 45, 46, 56; 427/8, 9; 118/102, 204

(56) References Cited

U.S. PATENT DOCUMENTS

| | | | | |
|---|---|---|---|---|
| 4,309,905 A | * | 1/1982 | Maizenberg et al. | 73/601 |
| 4,791,355 A | * | 12/1988 | Coulter et al. | 324/71.1 |
| 6,072,313 A | | 6/2000 | Li et al. | |
| 6,188,292 B1 | * | 2/2001 | Liu | 331/45 |
| 6,456,096 B1 | * | 9/2002 | Ericson et al. | 324/707 |
| 6,518,776 B2 | * | 2/2003 | Charneau et al. | 324/662 |
| 6,593,738 B2 | | 7/2003 | Kesil et al. | |
| 6,690,176 B2 | * | 2/2004 | Toncich | 324/629 |

OTHER PUBLICATIONS

U.S. patent application Ser. No. 10/359,378, Boris Kesil et al., filed 2003.
U.S. patent application Ser. No. 10/386,648, Boris Kesil et al., filed 2003.
U.S. patent application Ser. No. 10/434,625, Boris Kesil et al., filed 2003.
U.S. patent application Ser. No. 10/449,892, Boris Kesil et al., filed 2003.
S. Roach in article "Designing and Building an Eddy Current Position Sensor" at http://www.sensormag.com/articles/0998/edd0998/main.shtml, Sep. 1998.

* cited by examiner

*Primary Examiner*—N. Le
*Assistant Examiner*—Hoai-An D. Nguyen

(57) ABSTRACT

A universal electromagnetic resonance system is aimed at detecting and measuring local non-uniformities in objects made from conductive or non-conductive materials. The system comprises a composite measuring unit composed of two identical and symmetrically arranged individual oscillation circuits with measurement elements in the form of identical and symmetrically arranged inductive coils or capacitor chips. The unit is connected to an impedance analyzer for supplying RF current and for measuring the voltage signal in the oscillation circuit. Since all the elements of individual oscillation circuits are identical, in the case of non-uniformity of the object on the scanned area, the parameters of the resonance will hanged. This change will violate the symmetry in the operation of the individual oscillation circuits. The variation in measured signal can be calibrated in terms of the target parameter or characteristic of the object.

17 Claims, 8 Drawing Sheets

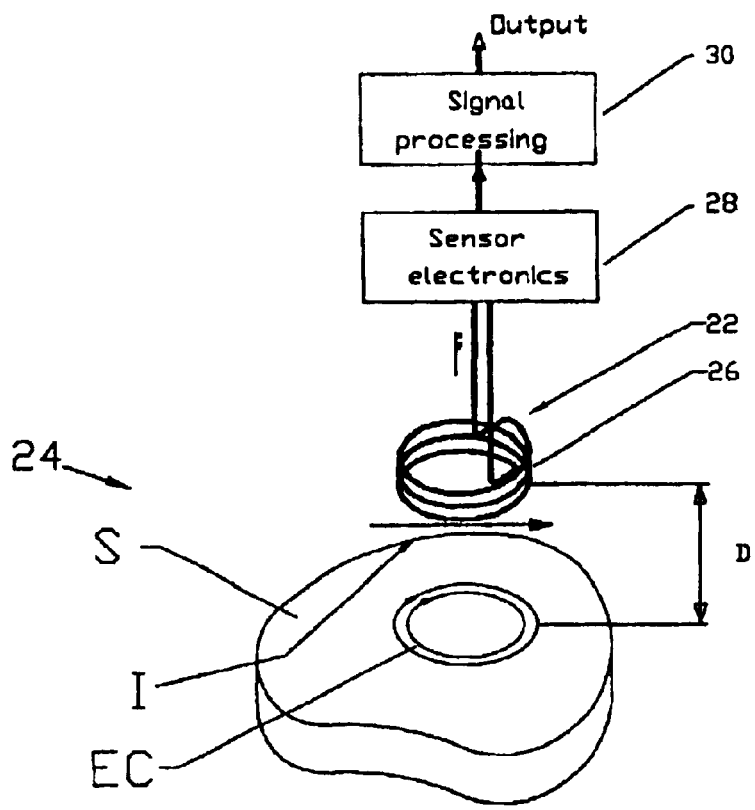
Fig. 1 PRIOR ART
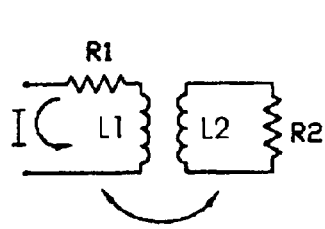 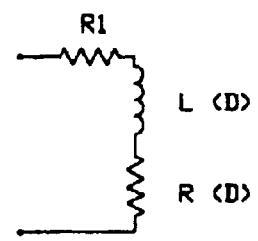
Fig. 2 PRIOR ART      Fig. 3 PRIOR ART

UNIVERSAL ELECTROMAGNETIC RESONANCE SYSTEM FOR DETECTING AND MEASURING LOCAL NON-UNIFORMITIES IN METAL AND NON-METAL OBJECTS

CROSS-REFERENCE TO RELATED APPLICATIONS

The present patent application is a continuation of the following U.S. patent applications: Ser. No. 10/359,378 filed Feb. 7, 2003 and entitled: "Method and Apparatus for Measuring Thickness of Thin Films with Improved Accuracy"; Ser. No. 10/434,625 filed May 12, 2003 and entitled "Method and System for Measuring Thickness of Thin Films with Automatic Stabilization of Measurement Accuracy"; and Ser. No. 10/449,892 filed on Jun. 2, 2003 and entitled "System and Method for Measuring Characteristics of Materials with the Use of a Composite Sensor".

FIELD OF THE INVENTION

The present invention relates to the field of measurement of film properties, more specifically, to detecting and measuring local non-uniformities in thin conductive and non-conductive films on various conductive or non-conductive substrates. In particular, the invention may find use in detecting and measuring microinclusions contained inside and on the surfaces of thin films and topography of . . . patterns in multilayered structures. The invention may find use in the production of semiconductor devices and instruments.

BACKGROUND OF THE INVENTION

There exists a great variety of methods and apparatuses used in the industry for measuring thickness of coating films and layers applied or laid onto substrates. These methods and apparatuses can be classified in accordance with different criteria. Classification of one type divides these methods into direct and indirect. An example of a direct method is measurement of a thickness in thin metal coating films by means of so-called X-ray reflectivity. One of these methods is based on a principle that X-rays and gamma-rays are absorbed by matter. When a beam of rays passes through a material, the amount of the beam absorbed depends on what elements the material consists of, and how much of the material the beam has to pass through. This phenomenon is used to measure the thickness or density of a material. The advantage of measuring in this way is that the gauge does not have to touch the material it is measuring. In other words, in thickness measurement, the surface of a web or strip product will not be scratched. The instrument for this method is e.g., RMS1000 Radiometric System produced by Staplethorne Ltd (UK). The instrument uses a suitable radiation source and one or more radiation detectors installed in a mechanical housing which also provides high quality radiological shielding. The source may be an X-ray tube or a radioactive source. The instrument also uses a set of beam defining collimators and one or more radiation detectors. The detectors measure the radiation absorbed within the object or flow being measured and output the signal data to a computer. For thickness gauging, the collimators usually define a single, narrow beam. This gives optimum spatial resolution.

A disadvantage of radiation methods is the use of X-ray or gamma radiation that requires special safety measures for protection of the users against the radiation. The instruments of this type are the most expensive as compared to metrological equipment of other systems.

Another example of direct measurement is a method of optical interferometry, described e.g., by I. Herman in "Optical Diagnostics for Thin Film Processing", Academic Press, 1996, Chapter 9. Although the optical interferometry method produces the most accurate results in measuring the thickness of a coating film, it has a limitation. More specifically, for conductive films, to which the present invention pertains, this method is limited to measurement of extremely thin coating films which are thin to the extent that a nontransparent material, such as metal, functions as transparent. In other words, this method is unsuitable or is difficult to use for measuring conductive films thicker than 200 Å to 500 Å.

Another example of direct measurement methods is measuring thickness of a film in situ in the course of its formation, e.g., in sputtering, magnetron target sputtering, CVD, PVD, etc. These methods, which are also described in the aforementioned book of I. Herman, may involve the use of the aforementioned optical interferometry or ellipsometry. However, in this case measurement is carried out with reference to both the surface of the substrate and the surface of the growing layer. Therefore, this method is applicable to measuring thickness of the film that has been already deposited with considerable limitations.

In view of the problems associated with direct methods, indirect non-destructive methods are more popular for measuring thickness of ready-made films. An example of a well-known non-destructive indirect method used for measuring thickness of a film is the so-called "four-point probe method". This method is based on the use of four contacts, which are brought into physical contact with the surface of the film being measured. As a rule, all four contacts are equally spaced and arranged in line, although this is not a compulsory requirement. Detailed description of the four-point probe method can be found in "Semiconductor Material and Device Characterization" John Wiley & Sons, Inc., N.Y., 1990, pp. 2–40, by D. Schroder. The same book describes how to interpret the results of measurements. This method is classified as indirect because the results of measurement are indirectly related to the thickness of the film. It is understood that each measurement of electric characteristics has to correlated with the actual thickness of the film in each particular measurement, e.g., by cutting a sample from the object and measuring the thickness of the film in a cross-section of the sample, e.g., with the use of an optical or electron microscope. Nevertheless, in view of its simplicity, low cost, and convenience of handling, the four-point probe method is the most popular in the semiconductor industry.

However, the four-point method has some disadvantages. The main problem associated with the aforementioned four-point probe method consists in that in each measurement it is required to ensure reliable contact in each measurement point. This is difficult to achieve since conditions of contact vary from sample to sample as well as between the four pointed contact elements of the probe itself in repeated measurement with the same probe. Such non-uniformity affects the results of measurements and makes it impossible to perform precision calibration.

The authors of the present invention have developed a new approach for measuring characteristics of thin conductive and non-conductive films based on the use of oscillating circuits that interact with the object to be measured under specific resonance condition. The authors named the aforementioned new approach as Resonance Sensor Technology (hereinafter referred to as RST).

This technology has been developed by Miltimetrixs, CA in the beginning of 1999 and is currently being improved.

For better understanding the principle of RST, it would be advantageous to shortly describe the structure and operation of conventional inductive sensors for measuring, e.g., film thickness.

For example, U.S. Pat. No. 6,072,313 issued in 2000 to L. Li et al. describes in-situ monitoring and control of conductive films by detecting changes in induced eddy currents. More specifically, the change in thickness of a film on an underlying body such as a semiconductor substrate is monitored in situ by inducing a current in the film, and as the thickness of the film changes (either increase or decrease), the changes in the current are detected. With a conductive film, eddy currents are induced in the film by generating an alternating electromagnetic field with a sensor, which includes a capacitor and an inductor. The main idea of the apparatus of U.S. Pat. No. 6,072,313 consists of using a resistor and a capacitor in a parallel resonance circuit. The resonance is caused by means of an oscillator. The inductive coupling between the oscillation circuit and the Eddy current induced in the coating is used for improving a signal/noise ratio and can be used for improving quality of measurements. In fact, this is a method well known in the radio-electronics for measuring under conditions of the electrical resonance. The above patent describes the aforementioned inductive method for measuring thickness of a film in chemical mechanical polishing (CMP).

A similar inductive method, which was used for measuring thickness of a slag, is disclosed in U.S. Pat. No. 5,781,008 issued in 1998 to J. Muller et al. The invention relates to an apparatus for measuring the thickness of a slag layer on a metal melt in a metallurgical vessel. The apparatus comprises a first inductive eddy current sensor which indicates the distance of the apparatus from the metal melt as it is moved toward the melt. A second sensor detects when the apparatus reaches a predetermined distance relative to or contacts the slag layer and triggers the inductive eddy-current sensor when such distance is attained. The sensors are arranged in a predetermined spatial relation, and the thickness of the slag layer is determined by an evaluation device, which analyzes the received signals. The apparatus permits measurement of the thickness of the slag layer without the need of additional equipment (e.g. mechanical lance movement or distance measurement).

The method and apparatus of U.S. Pat. No. 5,781,008 relate to macro-measurements of thick layers, and the sensors used in the apparatus of this invention are inapplicable of measuring thickness of thin-film coatings on such objects as semiconductor wafers and hard-drive disks. Furthermore, once the second sensor has detected that the apparatus reached a predetermined distance relative to or contacts the slag layer, this distance remains unchanged during the measurement procedure. This condition is unacceptable for measuring thickness of a thin film with microscopic thickness which moves relative to the sensor, e.g., for mapping, i.e., for determining deviations of the thickness over the substrate.

In order to understand why the use of known eddy-current sensor systems utilizing a measurement eddy-current sensor and a proximity sensor cannot be easily and directly applicable to measurement of microscopically-thin film coatings on conductive or non-conductive substrates, let us consider constructions and operations of the aforementioned known systems in more detail.

Normally, all inductive sensors are based on the principle that in its simplest form an inductive sensor comprises a conductive coil, which is located in close proximity to a conductive film to be measured and in which an electric current is induced. The conductive film can be considered as a short-circuited virtual coil turn with a predetermined electrical resistance. Since a mutual inductance exists between the aforementioned conductive coil and the virtual coil turn, an electric current is generated in the virtual coil turn. This current is known as eddy current or Foucault current. Resistance of the virtual coil turn, which depends on the material of the conductive film and, naturally, on its thickness, influences the amplitude of the alternating current induced in the virtual turn. It is understood that the amplitude of the aforementioned current will depend also on the thickness of the conductive film.

However, realization of a method and apparatus based on the above principle in application to thin films is not obvious. This is because such realization would involve a number of important variable parameters which depend on a specific mode of realization and which are interrelated so that their relationships not always can be realized in a practical device.

In order to substantiate the above statement, let us consider the construction of an Inductive sensor of the aforementioned type in more detail. FIG. 1 is a schematic view of a known inductive sensor used, e.g., for positioning of an inductive sensor 22 relative to the surface S of an object 24. Let us assume that the surface S of the object 24 is conductive. The inductive sensor 22 comprises an electromagnetic coil 26 connected to an electronic unit 28, which, in turn, is connected to a signal processing unit 30. The latter can be connected, e.g., to a computer (not shown). The electronic unit 28 may contain a signal oscillator (not shown), which induces in the electromagnetic coil 26 alternating current with a frequency within the range from several kHz to several hundred MHz.

In a simplified form the sensor of FIG. 1 can be represented by a model shown in FIG. 2. In this model, L1 designates inductance of the electromagnetic coil 26; R1 designates resistance of the coil 26; L2 designates inductance of the aforementioned virtual coil turn; and R2 is electrical resistance of the aforementioned virtual coil turn. M designates mutual induction between L1 and L2.

It can be seen from the model of FIG. 2 that the amplitude of current I generated in coil 26 will depend on R1, L1, L2, R2 and M. It is also understood that in this influence M is the most important parameter since it directly depends on a distance from the inductive sensor 22 to the surface S.

FIG. 3 is further simplification of the model of FIG. 2. Parameters L and R are functions that can be expressed in terms of L1, L2, M, R1, and R2. Therefore, as shown in FIG. 3, these parameters can be considered as functions L(D) and R(D).

The model of FIG. 3 can also be characterized by a quality factor Q, which is directly proportional to the frequency of the current in the sensor coil 26, to inductance of the sensor of FIG. 3, and is inversely proportional to a distance D (FIG. 2) from the sensor coil 26 to the surface S. The higher is the value of Q, the higher is stability of the measurement system and the higher is the measuring accuracy. Thus it is clear that in order to achieve a higher value of Q, it is necessary to operate on higher frequencies of the alternating currents in the inductance coil 26. Analysis of relationships between Q, L, and R for a fixed distance D was made by S. Roach in article "Designing and Building an Eddy Current Position Sensor" (see in the Internet at the following address: http://www.sensormag.com/articles/0998/edd0998/main.shtml.) S. Roach introduces an important parameter, i.e., a ratio of D to the diameter of the sensor coil 26, and shows that R does not practically depend on the above ratio, while the increase of this parameter leads to the growth in L and Q. When distance D becomes equal approximately to the diameter of the coil 26, all three parameters, i.e., L, Q, and R are stabilized, i.e., further increase in the distance practically does not change these parameters. In his important work, S. Roach generalized the relationships between the aforementioned parameters and showed that, irrespective of actual dimensions of the sensor, "the rapid loss of sensitivity with distance strictly limits the range of eddy current sensor to about ½ the coil diameter and constitutes the most important limitation of this type of sensing".

The impedance of the coil also depends on such factors as film thickness, flatness of the film, transverse dimensions, temperature of the film and coil, coil geometry and DC resistance, operating frequency, magnetic and electric properties of the film, etc.

As far as the operating frequency of the inductive coil is concerned, the sensor possesses a self-resonance frequency, which is generated by an oscillating circuit formed by the power-supply cable and the capacitor. As has been shown by S. Roach, in order to improve sensitivity, it is recommended to increase the quality factor Q and hence the frequency. However, the sensor must operate on frequencies at least a factor of three below the self-resonant frequency, Thus, practical frequency values for air core coils typically lie between 10 kHz and 10 MHz.

The depth of penetration of the electromagnetic field into the conductive film is also important for understanding the principle of operation of an inductive sensor. Generally the correlation between electromagnetic field penetration depth in the examined film and its thickness is one of the most important parameters in consideration of the discussed phenomenon. It is known that when an alternating electromagnetic field propagates from non-conductive medium into a conductive medium, it is dampened according to an exponential law. For the case of propagation through the flat interface, electric and magnetic components of the alternating electromagnetic field can be expressed by the following formulae:

$$E = E_0 \exp(-\alpha x)$$

$$H = H_0 \exp(-\alpha x),$$

where $\alpha = (\pi f \mu \sigma)^{1/2}$, f is oscillation frequency of the electromagnetic field, $\sigma$ is conductivity of the medium, and $\mu = \mu_0 = 1.26 \times 10^{-6}$ H/m (for non-magnetic materials).

Distance x from the interface, which is equal to $$x = \delta = 1/\alpha = 1/(\pi f \mu \sigma)^{1/2} \quad (1)$$

and at which the amplitude of the electromagnetic wave decreases by e times, is called the depth of penetration or a skin layer thickness. Based on formula (1), for copper on frequency of 10 kHz the skin depth $\delta$ is equal approximately to 650 $\mu$m, on frequency of 100 kHz to 200 $\mu$m, on frequency of 1 MHz to 65 $\mu$m, and on frequency of 10 MHz to 20 $\mu$m. The following table 1 represents the penetration depths for copper and aluminum calculated using the equation (1).

The above values show that for the films used in the semiconductor industry, which are typically with the thickness on the order of 1 $\mu$m or thinner, in the direction perpendicular to the surface the electromagnetic field can be considered practically as uniform. This is because on any frequency in the range from 10 KHz to 10 MHz the electromagnetic waves begin to dampen on much greater depth than the thickness of the aforementioned films.

At the same time, deviations from uniformity in the thickness of the conductive coating films used in the semiconductor industry, e.g., copper or aluminum layers on the surface of silicon substrates, should not exceed 5%, and in some cases 2% of the average thickness of the layer. In other words, the deviations should be measured in hundreds and tens of Angstroms. Conventional Eddy Current Sensor (as described above) connects the sensing element and the examined film via the electromagnetic field, in particular via mutual induction of the sensing element's coil and the virtual loop of current, induced by the coil's current field. Thin films accumulate only small part of the field induced by the coil of the sensor, and the thinner is the film, the smaller is the accumulated field.

It can also be said that with the decrease of the thickness of the measured film the inductance of the virtual loop decreases too. Therefore, the mutual inductance or the absolute interaction value for the system also decreases. Hence, for the thin films the measured signal of the traditional Eddy Current sensor is so small that it is comparable with the level of electrical noise.

It is understood that conventional inductive sensors of the types described above and used in a conventional manner have limited applications for the solution of the above obvious task when measuring the thin layers is therefore to improve signal-to-noise ratio.

In the initial period, the applicants were targeted at improving conventional Eddy Current Sensors. For example, U.S. Pat. No. 6,593,738 issued on Jul. 15, 2003 to Boris Kesil, et al. describes the an apparatus and method for thin film diagnostics and includes an example of the setup design for precision measurements using conventional (inductive, Eddy Current) and capacitive sensors.

The apparatus consists of an inductive sensor and a proximity sensor, which are rigidly interconnected though a piezo-actuator used for displacements of the inductive sensor with respect to the surface of the object being measured.

Based on the results of the operation of the proximity sensor, the inductive sensor is maintained at a constant distance from the controlled surface. Variations in the thickness of the coating film and in the distance between the inductive sensor and the coating film change the current in the inductive coil of the sensor. The inductive sensor is calibrated so that, for a predetermined object with a predetermined metal coating and thickness of the coating, varia-

TABLE 1

| Frequency | 1 kHz | 10 kHz | 100 kHz | 1 MHz | 10 MHz | 100 MHz | 1 GHz | 10 GHz | 100 GHz | $10^5$ GHz |
|---|---|---|---|---|---|---|---|---|---|---|
| Wavelength | $3 \cdot 10^5$ m | $3 \cdot 10^4$ m | $3 \cdot 10^3$ m | $3 \cdot 10^2$ m | 30 m | 3 m | 0.3 m | 0.03 m | 3 mm | 1 $\mu$m |
| $\delta$, mm, Copper | 2.087 | 0.66 | 0.21 | 0.066 | 0.021 | 0.0066 | 0.0021 | | | |
| $\delta$, $\mu$m, Copper | | | | 66 | 21 | 6.6 | 2.1 | 0.6 | 0.2 | 0.006 |
| $\delta$, mm, Aluminum | 2.62 | 0.83 | 0.26 | 0.083 | 0.026 | 0.0083 | 0.0026 | | | |
| $\delta$, $\mu$m, Aluminum | | | | 83 | 26 | 8.3 | 2.6 | 0.83 | 0.26 | 0.008 | tions in the amplitude of the inductive sensor current reflect fluctuations in the thickness of the coating. The distinguishing feature of the invention resides in the actuating mechanism of microdisplacements and in the measurement and control units that realize interconnection between the proximity sensor and the inductive sensor via the actuating mechanism. The actuating mechanism is a piezo actuator. Measurement of the film thickness in the submicron range becomes possible due to highly accurate dynamic stabilization of the aforementioned distance between the inductive sensor and the object. According to one embodiment, the distance is controlled optically with the use of a miniature interferometer, which is rigidly connected to the inductive sensor. According to another embodiment, the distance is controlled with the use of a capacitance sensor, which is also rigidly connected to the inductive sensor.

However, the sensor disclosed in the aforementioned U.S. Pat. No. 6,593,738 could not completely solve the problems associated with accurate measurement of super-thin films, e.g., of those thinner than 500 Angstroms. This is because the construction of the aforementioned sensor is limited with regard to the range of operation frequencies, i.e., the sensor cannot be used in frequencies exceeding 30 MHz. The above problems restrict practical application of the method and apparatus of U.S. Pat. No. 6,593,738 for measuring thickness of very thin films and deviations from the thickness in the aforementioned films. Furthermore, it is obvious that the aforementioned method and apparatus do not allow thickness measurement of non-conductive films. The sensor has relatively large overall dimensions and comprises a stationary measurement instrument.

Another disadvantage of the sensor of the aforementioned patent is that it is very sensitive to variations of the distance between the sensor and the film. This requirement dictates the use of expensive and complicated distance-measurement and distance control means such as micro interferometers or microscopes and piezoactuators.

U.S. patent application Ser. No. 359,378 filed by Boris Kesil, et al. on Feb. 7, 2003 describes the principles of RST which are based on the following features: 1) in contrast to the majority of known inductive sensors, the RST sensors operate on resonance conditions; 2) there exist several resonance conditions, and the RST sensors operate mainly under conditions of complete resonance; 3) under conditions of complete resonance, the Q-factor of the system "sensor-object" may be significantly higher than the Q-factor of a single inductive sensor. Incorporation of the aforementioned three features into the structure of the measurement system results in significant improvement of sensitivity and repeatability of measurements and makes it possible to measure characteristics of the film in a wide ranges of thicknesses from hundreds Angstroms to several tens of microns.

The new apparatus disclosed in this application consists of an inductive coil having specific parameters, an external AC generator operating on frequencies, e.g., from 50 MHz to 2.5 GHz, preferably from 100 MHz to 200 MHz, and a measuring instrument, such as an oscilloscope, voltmeter, etc., for measuring output of the sensor. The coil has miniature dimensions. The invention is based on the principle that the inductive coil of the sensor, active resistance of the coil winding, capacitance of the inductive coil (or a separate capacitor built into the sensor's circuit), and the aforementioned AC generator form a parallel oscillating circuit.

The main distinction of the sensor of the device proposed in the aforementioned patent application from all conventional devices of this type is that it operates on very high resonance frequencies in comparison with frequencies used in devices described in another patents mentioned above preferably within the range of 100 to 200 MHz. In order to maintain the aforementioned high frequency range, the oscillating circuit should have specific values of inductance L (several nano-Henries) and capacitance C (several pico-Farades), and in order to provide accurate measurements, the Q-factor for the above frequencies should exceed 10. It has also been found that on such frequencies the capacitive coupling between the coil of the oscillating circuit and the virtual coil induced in the film acquire the same weight as the mutual inductance between the both coils. In other words, the system can be described in terms of inductive-capacitive interaction between the sensor and the film to be measured. The capacitive-coupling component determines new relationships between the parameters of the film, mainly the film thickness, and parameters of the resonance oscillating circuit. By measuring the parameters of the resonance oscillating circuit, it becomes possible to measure film thickness below 500 Angstroms, as well as other characteristics of the film.

However, in the apparatus of U.S. patent application Ser. No. 359,378, the method and system for stabilization of the distance between the sensor and the surface of the film being measured remain the same as in first-mentioned U.S. Pat. No. 6,593,738, and this feature limits significant potentials of the new method and system.

The method and apparatus aimed at still further improvement of properties disclosed in aforementioned U.S. patent application Ser. No. 359,378 are described in new U.S. patent application Ser. No. 10/386,648 filed by the same applicants (Boris Kesil, et al.) as the previous application on Mar. 13, 2003. This new apparatus allows highly accurate and efficient contactless measurement of film thicknesses below 1000 Angstroms by means of a microwave resonance sensor. The apparatus consists of a special resonator unit in the form of an open-bottom cylinder, which is connected to a microwave swept frequency source via a decoupler and a matching unit installed in a waveguide that connects the resonator unit with the microwave source.

The microwave generator is fed from a power supply unit through a frequency modulator that may sweep the frequency of microwaves generated by the microwave generator. All the controls can be observed with the use of a display, such as, e.g., a monitor of a personal computer, which may be connected to the microwaveguide line, e.g., via a directed branched waveguide line for directing waves reflected from the resonator, via a reflected wave detector, an amplifier, a synchronous detector, an A/D converter, and a digital voltmeter. A feedback line is going from a direct wave detector, which is installed in a line branched from the microwaveguide between the decoupler and the matching unit, to the power supply unit. The operation resonance frequency of the resonator sensor unit should be somewhere within the range of swept frequencies of the microwave generator.

In operation, the microwave generator generates electromagnetic waves in a certain sweeping range that induces in the resonator sensor unit oscillations on the resonance frequency with a Q-factor on the order of $10^4$ or higher. A distinguishing feature of the resonator of this system is that the design parameters of the resonator unit allow achieving the aforementioned high Q-factor without physical contact of the sensor unit with the film to be tested. As the surface of the film to be measured constitutes the inner surface of the resonator unit, even a slightest deviation in conductivity will exert a significant influence on the Q-factor. The Q-factor, in turn, defines the height of the resonance peak. As the conductivity directly related to the film thickness, it is understood that measurement of the film thickness is reduced to measurement of the resonance peak amplitudes. This means that super-high accuracy inherent in measurement of the resonance peaks is directly applicable to the measurement of the film thickness or film thickness deviations.

However, since this resonator is a three-dimensional or special device, the measurement surface may have the minimum value on the order of several square millimeters. In such a construction the diameter of the probe practically cannot be reduced beyond the limit of about 0.5 cm$^2$. In other words, even though the microwave resonance sensor of the type described in U.S. patent application Ser. No. 10/386,648 is extremely accurate with regard to stabilization of the sensor-gap distance, it has limitations with regard to the lateral measurement accuracy.

In the light of further development of RST systems, the applicants of the previous patent application (Boris Kesil, et al) invented a new system and method disclosed in U.S. patent application Ser. No. 10/434,625 filed on May 12, 2003. These new method and system are based on stabilization of the distance between the sensor coil and the surface of the film being measured by constantly measuring the angle of inclination a of a tangent to the curve that represents dependence of the resonance power of the sensor-film system from the distance between the sensor and the film.

The aforementioned angle is calculated by plotting the resonance curve of a signal, calculating the area between the resonance curve and the abscissa axis, plotting the curve that represents dependence of the aforementioned area from the distance between the sensor coil and the film, measuring the angle a in a preselected point on the last-mentioned curve, and maintaining the distance between the sensor coil and the film constant by keeping angle $\alpha$ constant in any measurement point. Angle $\alpha$ can be selected within the range of 0 to 90° C. It means that the same sensor are using simultaneously for film property measurements and the distance between sensor and surface of the film control.

Further improvement of the aforementioned RST system is reflected in another U.S. patent application Ser. No. 10/449,892 filed by Boris Kesil, et al. on Jun. 2, 2003. The system disclosed in this application is aimed at measuring characteristics of thin conductive and non-conductive materials, such as bulk materials or films. The invention is based on the use of a resonance oscillating circuit that incorporates at least two components selected from the group consisting of an inductive coil and a capacitor, which in combination form a sensor that could be approached closer to the surface to be measured. The measurement of the film or material characteristics, such as film resistance (film thickness) or a dielectric constant (film thickness) of a non-conductive material, is based on the principle that the sensor is approached to the measured surface at a distance, at which the inductance and capacitance of the sensor generate in the measured material a virtual coil and an additional capacitance, which strongly depends on the characteristics of the measured material.

In particular, FIG. 4 illustrates one embodiment of the measurement system described in U.S. patent application Ser. No. 10/449,892, in which a sensor 20 is composed of at least two elements, i.e., two inductive coils 22a and 22b. The lower ends 22a' and 22b' of the inductive coils 22a and 22b are electrically connected to a terminal of a control and supply circuit (terminal B in FIG. 4B of U.S. patent application Ser. No. 10/1449,892). The opposite ends of the inductive coils 22a and 22b are connected to each other and to terminal A of the aforementioned circuit of FIG. 4B. The inductive coils 22a and 22b are located on the side of the composite sensor, which is intended for interaction with the object S that may comprise, e.g., a metal film, semiconductor film, dielectric film, or a bulk conductive or non-conductive material. The circuit may contain a variable capacitor (not shown) that can be used for adjusting the frequency of the oscillating circuit formed by the inductive coils. When, in the course of measurements, the coils are energized from an a.c. generator of a sufficiently high frequency (e.g., higher than 100 MHz), but the object S is absent or is located at a remote distance, a capacitive coupling is induced between the closely spaced coils 22a and 22b (see FIG. 16 of the above application that illustrates positions of closely spaced coils 72a and 72b). It is understood that under these conditions the inherent resonance can be achieved in the oscillating circuit even without participation of the object.

As the sensor approaches the surface to be measured, the sensor-material system generates a series of resonances having different values of power. One of these resonance can be defined as a so-called complete resonance, which is characterized by the maximum value of the power and, hence, provides almost always the most accurate measurement and can be used for precisely determining the measurement distance. By comparing the results of measurements with those known from measuring the precalibrated films or materials under the same conditions, it becomes possible to determine the target characteristics of the films or materials. Stabilization of the measurement distance can be carried out by the same methods as described in aforementioned U.S. patent application Ser. No. 434,625 of the same applicants. In the last-mentioned case, as well as in all previously described systems relating to RST, the inventions were aimed at measuring integral characteristics of films and bulk materials in the depth direction of the films and bulk materials. In principle, by scanning the surfaces of films and bulk materials with the sensors of the aforementioned systems, it could be possible to determine lateral deviations and non-uniformities on the surfaces of the objects being measured. In fact, the authors used such sensors for mapping such properties as film thickness, resistivity, dielectric constant, etc., of metallic and dielectric films on the surfaces of semiconductor wafers. However, in measuring local non-uniformities and deviations in properties, the dimensions of the measured areas that could be detected by the aforementioned sensors in the course of scanning of the surfaces being measured are limited by the dimensions of the sensor tips. The authors have found that the sensors of the aforementioned measuring systems can detect local non-uniformities on the scanned surfaces that are greater than at least $\frac{1}{10}$ of the cross-sectional area of the measuring coil of the sensor. The same relates to the sensitivity of the capacitor chip. It is understood that the aforementioned criterion of $\frac{1}{10}$ of the cross-sectional area of the measuring coil of the sensor is an approximate characteristic since in reality the dimensions of the detected non-uniformity will depend on the types of the materials of the object and characteristics of the sensor. In absolute values, the minimal characteristic dimension of non-uniformity detectable by the aforementioned sensor cannot be smaller than 10 $\mu$m. In some specific cases, the above limit can be reduced to 1 $\mu$m, but this can be achieved at the expense of high cost and labor consumption.

OBJECTS AND SUMMARY OF THE INVENTION

It is an object of the present invention to provide a system and method for measuring non-uniformities in properties and characteristics of films and bulk material by RST not only in the depth but also in the lateral direction. It is another object to provide the aforementioned method and system that are capable of detecting non-uniformities on the areas smaller than 1/10 of the cross-sectional area of the measuring coil or capacitor chip. Still another object is to provide the aforementioned system the construction of which is based on new combinations of the same measurement elements as the previous RST systems.

The system of the invention for measuring non-uniformities in properties and characteristics of films and bulk materials by RST utilizes a composite measuring unit or head composed of two identical and symmetrically arranged individual oscillation circuits that have capacitive, inductive, and capacitive-inductive couplings. The individual oscillation circuits contain measurement elements in the form of identical and symmetrically arranged inductive coils or capacitor chips. The composite measuring unit is connected via a PC board with capacitors or inductive coils to an RF impedance analyzer, which also may function as an inductance-capacitance-resistance meter (hereinafter referred to as impedance analyzer). The aforementioned combined oscillation circuit is energized from the impedance analyzer with RF frequency (about 100 MHz). One of the electrical terminals of the composite measuring unit for connection to one of the RF current outputs of the impedance analyzer is branched from the point of symmetry in the connection line between the aforementioned identical measurement elements of the composite measuring unit. Two other terminals of the composite measuring unit branched from sides of the measurement elements opposite to the first branch are connected to aforementioned capacitors or inductive coils of the PC board, respectively. The lead wires guided from the opposite ends of the aforementioned capacitors or inductive coils of the PC board are connected to each other and to the second RF current output of the impedance analyzer. Furthermore, the lead wire guided from the point of connection of the respective measurement elements with the PC board are connected to voltage or useful-signal terminals of the impedance analyzer.

Since all the elements of individual oscillation circuits are identical, in an activated state the entire system will oscillate as a simple single oscillation circuit with a certain resonance frequency. With the use of the impedance analyzer the aforementioned high frequency of the current is selected so that it is equal to the resonance frequency of the aforementioned single oscillation circuit. The voltage that is measured in the balanced state of the measurement unit, i.e., when there is no object in the vicinity of the sensor unit, is assumed as a reference voltage. When the sensor of the invention approaches the surface to be measured, the combined sensor of the invention forms with the measured object an object-sensor system with a virtual oscillation circuit induced in the object (in case the material of the object is metal). If the object is made of a dielectric material, the proximity of the sensor will change the capacitance of the sensor elements. In both cases, the resonance frequency of the combined sensor will be changed relative to the reference voltage. By changing the frequency of the current with the use of the impedance analyzer, it is possible to adjust the resonance of the combined sensor. When the surface of the object is scanned by the composite sensor in a transverse direction without the change in the gap between the sensor and the surface of the object, in the case of uniformity of the object on the scanned area, the parameters of the resonance will remain unchanged. As soon as the scanned area contains non-uniformity, such as inclusion of an impurity or changes on the surface, the parameters of the resonance will be changed due to change in the capacitive or inductive coupling between one of the measurement elements of the composite sensor, which located closer to the non-uniformity and the non-uniformity. This change will violate the symmetry in the operation of the individual oscillation circuits. This misbalance will be reflected in the voltage input signal of the impedance analyzer.

The variation in measured signal can be calibrated in terms of the target parameter or characteristic of the object, e.g., dimensions of the inclusion, depth of the inclusion, etc. Calibration is carried out by comparison with the results of the same measurement on a test object with known characteristics of non-uniformities.

Such a system makes it possible to detect non-uniformities on the areas smaller than 1/10 of the cross-sectional area of the measuring coil or capacitor chip.

BRIEF DESCRIPTION OF THE DRAWINGS

FIG. 1 is a schematic view of a known inductive sensor used, e.g., for positioning of an inductive sensor relative to the surface of an object to be measured.

FIG. 2 is a simplified model representation of the sensor of FIG. 1.

FIG. 3 is further simplification of the model of FIG. 2.

DETAILED DESCRIPTION OF THE INVENTION

Figure 4:
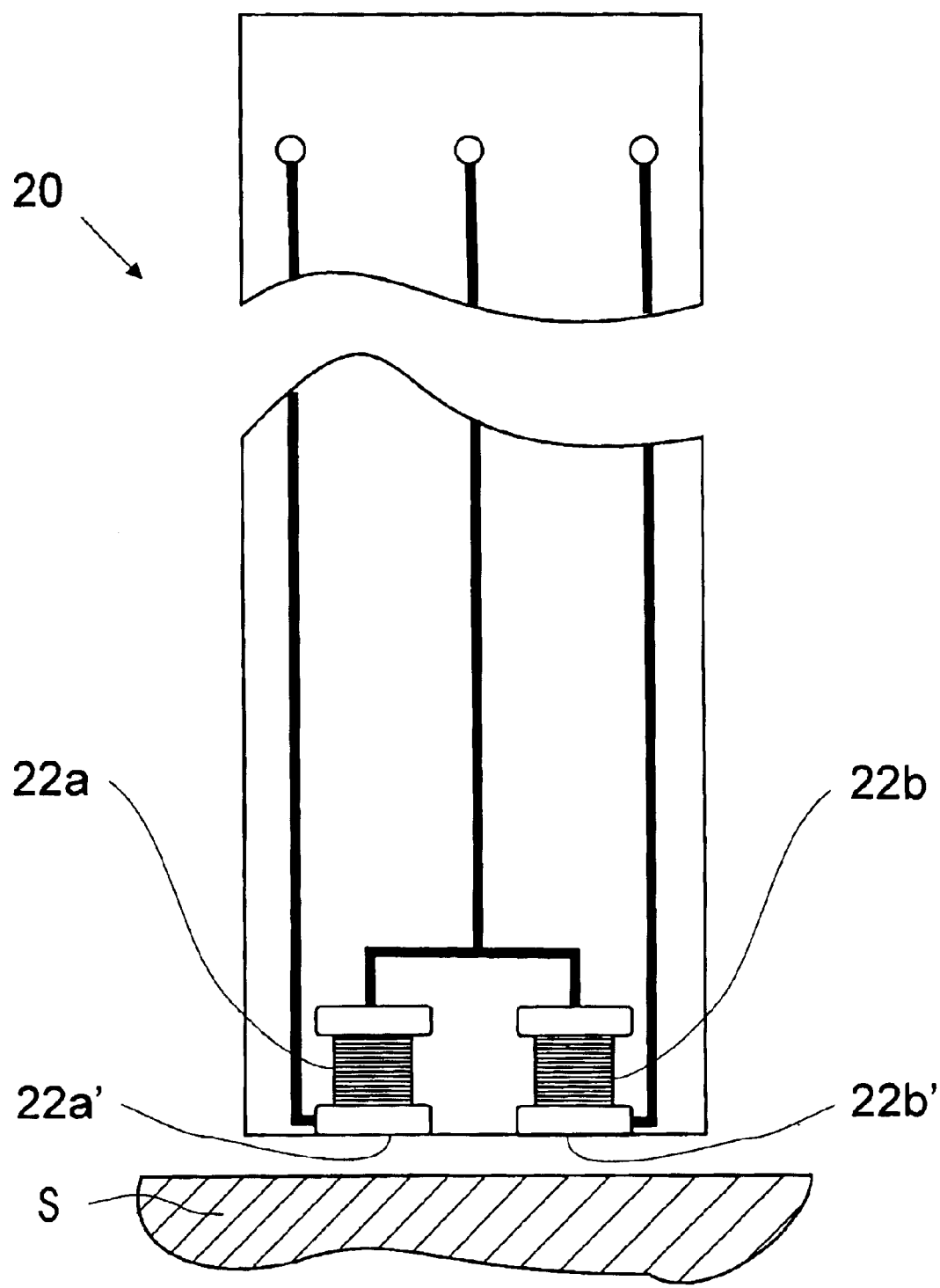
FIG. 4 is an electric circuit of a known composite oscillation measurement circuit composed of two simultaneously working measurement coils.
Figure 5:
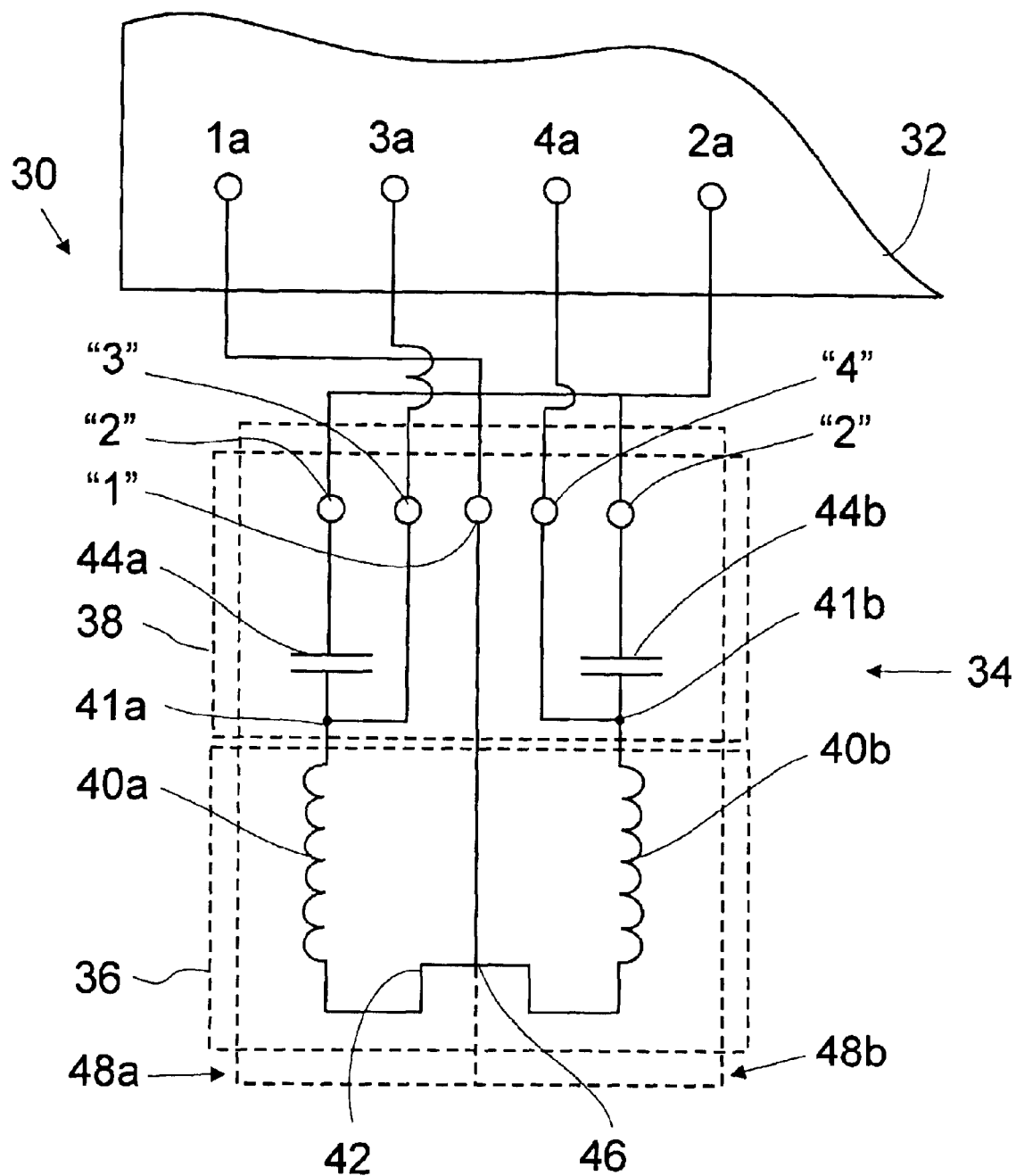
FIG. 5 is an electric circuit of the measurement system of the invention in accordance with one embodiment in which measurement elements comprise symmetrically arranged inductive coils.

FIG. 5 is a principle electric circuit of the measurement system 30 of the invention in accordance with one embodiment in which measurement elements comprise symmetrically arranged inductive coils. The system 30 consists of an impedance analyzer 32 and a composite measuring unit 34 composed a measurement head 36 and a PC board 38. The measurement head 36 is connected to the impedance analyzer 32 via the PC board 38 in a manner described below.

The measurement head 36 contains two identical and symmetrically arranged inductive coils 40a and 40b. One ends of the inductive coils 40a and 40b are connected to each other by a conductive link 42, while the opposite ends of the inductive coils 40a and 40b are connected in series to one sides of respective capacitors 44a and 44b located on the PC board 38. The other sides of the capacitors 44a and 44b are connected to input terminals "2", "2" of the composite measuring unit 34. The input terminals "2", "2" of the composite measuring unit 34, in turn, are connected to an output current terminal "2a" of the impedance analyzer 32. The impedance analyzer 32 is a commercially available unit and may comprise, e.g., a model Agilent 4191A RF instrument produced by HP/Agilent, CA, U.S.A.

Another input terminal "1" of the composite measuring unit 34 is branched from the point of symmetry 46 of the conductive link 42 between the aforementioned inductive coils 40a and 40b. The input terminal "1" of the composite measuring unit 34 is connected to an RF output current terminal "1a" of the impedance analyzer 32.

Points of connection 41a and 41b of respective inductive coils 40a and 40b of the measurement head 36 to respective capacitors 44a, 44b of the PC board 38 are connected to the output terminals "3" and "4" of the PC board 38 for further connection with input useful-voltage-signal terminals "3a" and "4a" of the impedance analyzer 32 (FIG. 5).

The inductive coil 40a of the measurement head 36, the capacitor 44a, and the RF current source (not shown) of the impedance analyzer 32 connected through the respective terminals "1a", "2a", and "1", "2", form a first oscillation circuit 48a. Similarly, the inductive coil 40b of the measurement head 36, the capacitor 44b, and the RF current source (not shown) of the impedance analyzer 32 connected through the respective terminals "1a", "2a", and "1", "2", form a second oscillation circuit 48b. The first oscillation circuit 48a and the second oscillation circuit 48b are arranged symmetrically with respect to the point of symmetry 46 (FIG. 5).

Figure 6:
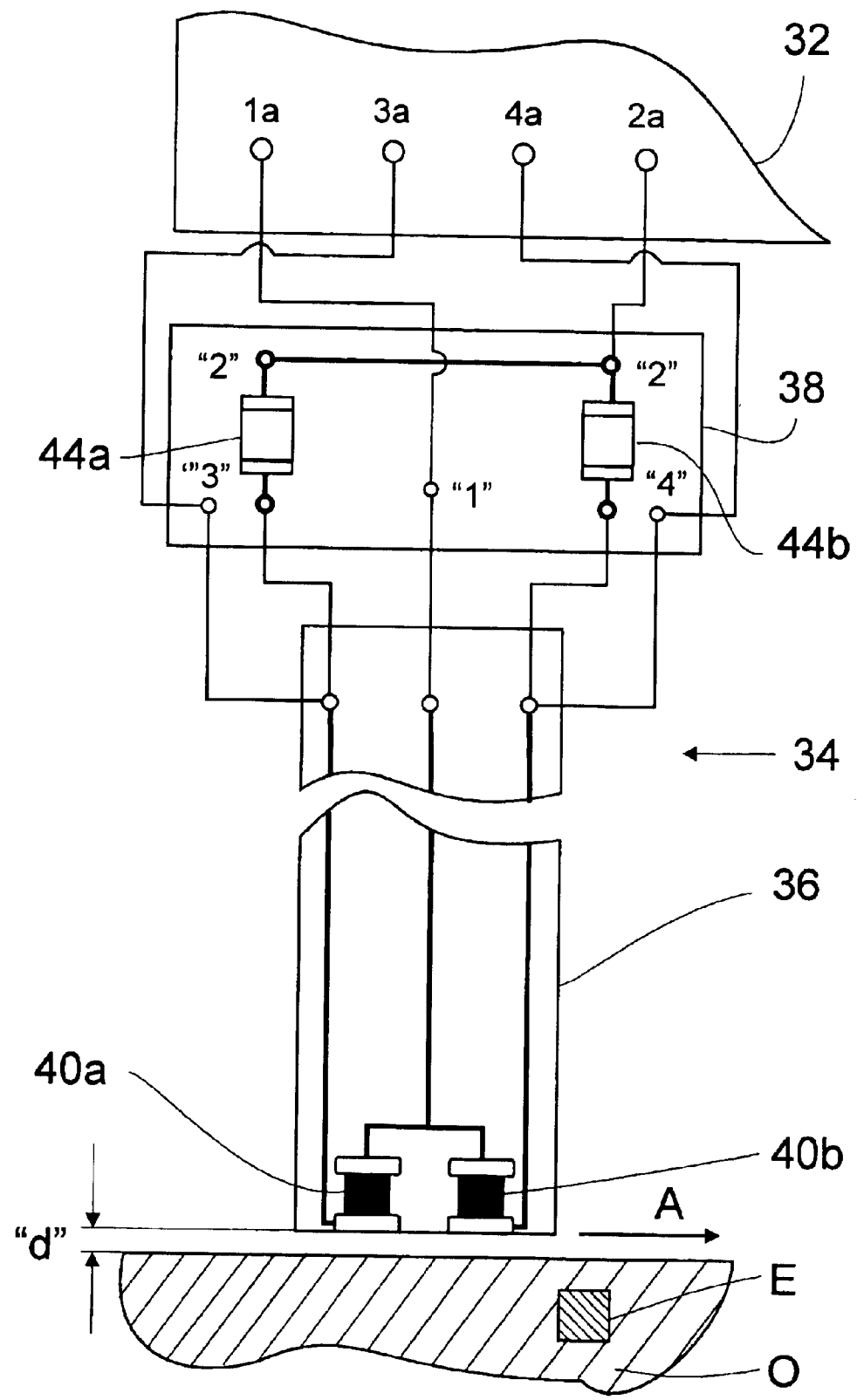
FIG. 6 is a view illustrating a mounting arrangement of elements of the circuits shown in the principle diagram of FIG. 5 with two inductive coils as measuring elements.

The mounting arrangement of elements of the circuits shown in the principle diagram of FIG. 5 is shown in FIG. 6. The measurement head 36 can be made in the form of an elongated PC board having a length of about 4–6 cm and about 2 to 2.5 mm wide with the inductive coils 40a and 40b mounted on the front end of the measurement head 36 which faces the measured object O at the distance d. Position E in FIG. 6 designates an embedded feature location, size, and material properties of which should to be determined.

Figure 7:
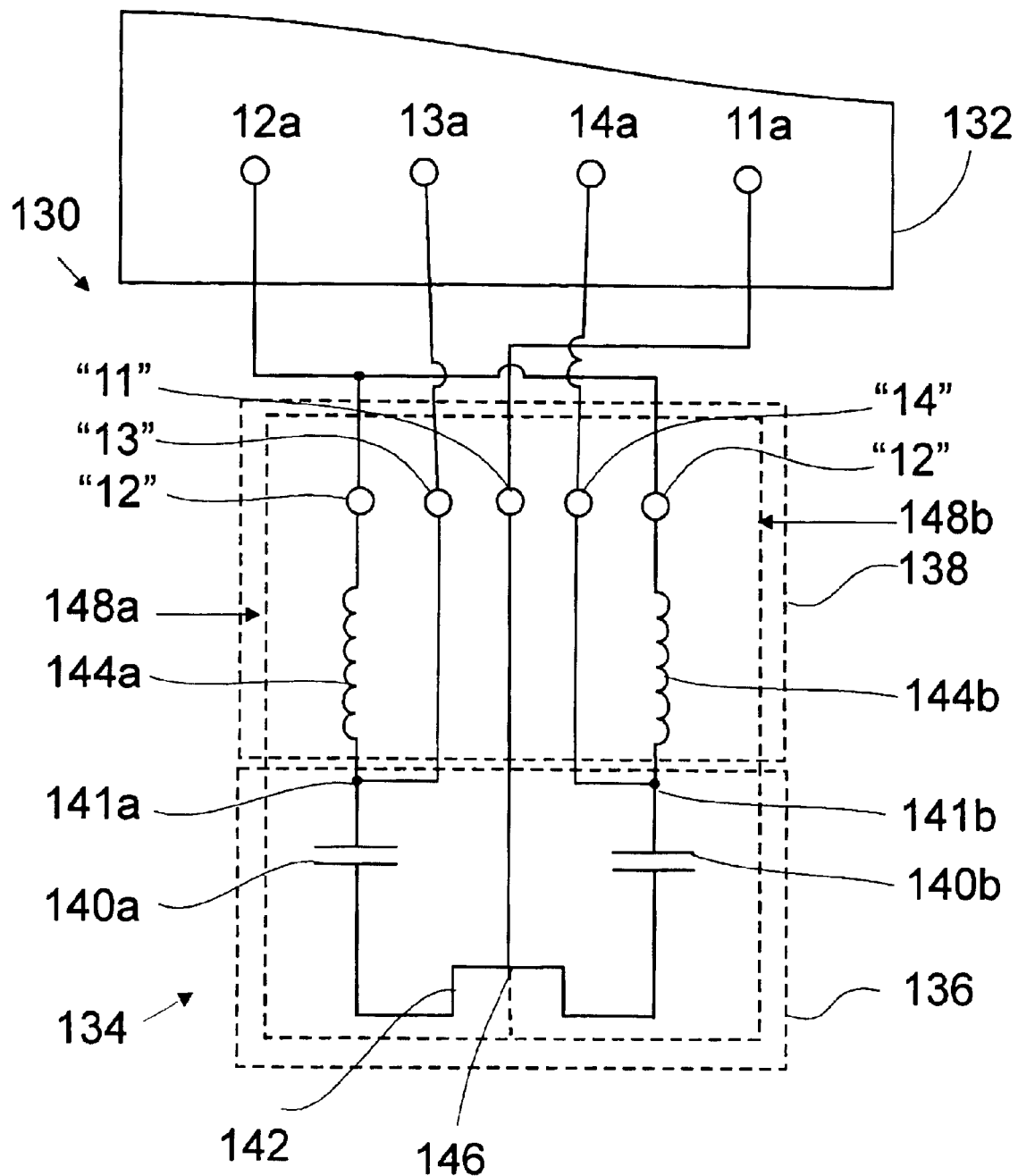
FIG. 7 is a principle electric circuit of the measurement system made in accordance with a second embodiment of the present invention.

FIG. 7 is a principle electric circuit of the measurement system 130 made in accordance with a second embodiment of the present invention, in which measurement elements comprise symmetrically arranged capacitors, e.g., capacitor chips. Similar to the previous embodiment, the system 130 consists of an impedance analyzer 132 and a composite measuring unit 134 composed a measurement head 136 and a PC board 138. The measurement head 136 is connected to the impedance analyzer 132 via the PC board 138 in a manner described below.

The measurement head 136 contains two identical and symmetrically arranged capacitor chips 140a and 140b. One sides of the capacitor chips 140a and 140b are connected to each other by a conductive link 142, while the opposite ends of the capacitor chips 140a and 140b are connected in series to one ends of respective inductive coils 144a and 144b located on the PC board 138. The other ends of the inductive coils 144a and 144b are connected to input current terminals "12", "12" of the composite measuring unit 134. The input current terminals "12", "12" of the composite measuring unit 134, in turn, are connected to an output current terminal "12a" of the impedance analyzer 132. The impedance analyzer 132 is a commercially available unit and may comprise, e.g., model Agilent 4191A RF instrument produced by HP/Agilent, CA, U.S.A.

Another input terminal "11" of the composite measuring unit 134 is branched from the point of symmetry 146 of the conductive link 142 between the aforementioned inductive coils 140a and 140b. The input terminal "11" of the composite measuring unit 134 is connected to an RF output current terminal "11a" of the impedance analyzer 132.

Points of connection 141a and 141b of respective capacitors 140a and 140b of the measurement head 136 to respective inductive coils 144a, 144b of the PC board 138 are connected to the output terminals "13" and "14" of the PC board 138 for further connection with the input useful-voltage-signal terminals "13a" and "14a" of the impedance analyzer 132 (FIG. 7).

The capacitor chip 140a of the measurement head 136, the inductive coil 144a, and the RF current source (not shown) of the impedance analyzer 132 connected through the respective terminals "11a", "12a", and "11", "12", form a first oscillation circuit 148a. Similarly, the capacitor chip 140b of the measurement head 136, the inductive coil 144b, and the RF current source (not shown) of the impedance analyzer 132 connected through the respective terminals "11a", "12a", and "11", "12", form a second oscillation circuit 148b. The first oscillation circuit 148a and the second oscillation circuit 148b are arranged symmetrically with respect to the point of symmetry 146 (FIG. 7).

Figure 8:
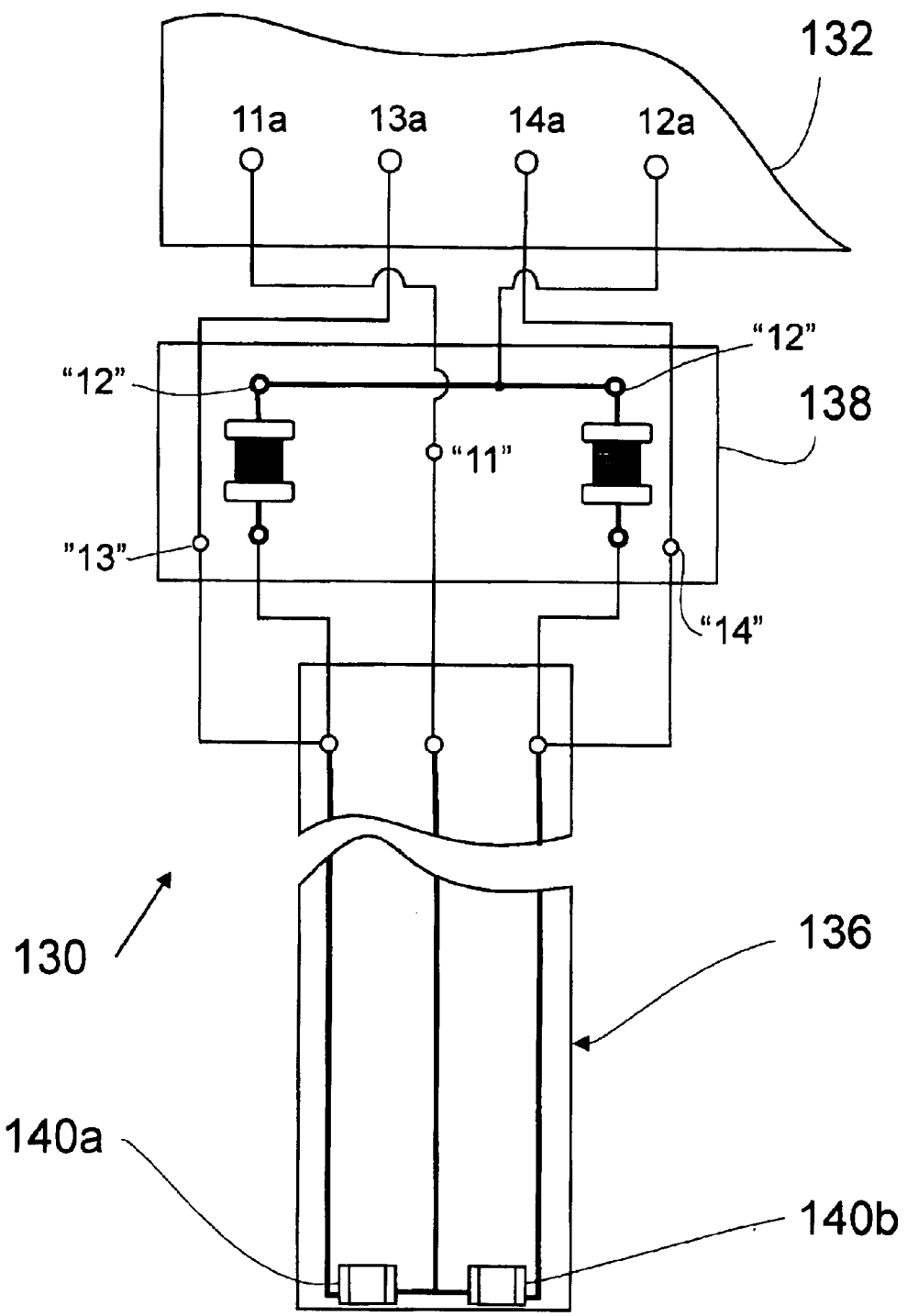
FIG. 8 is a mounting arrangement of elements of the circuits shown in the principle diagram of FIG. 7 with two capacitive chips as measuring elements.

The mounting arrangement of elements of the circuits shown in the principle diagram of FIG. 7 is shown in FIG. 8. The measurement head 136 can be made in the form of an elongated PC board having a length of about 4–6 cm and about 2 to 2.5 mm wide with the capacitor 140a and 140b mounted on the front end of the measurement head 136, which faces the object being measured (not shown in FIG. 8). The capacitor chips 140a and 140b are position so that the capacitor plates are arranged substantially perpendicular to the surface of the object being measured.

Figure 9:
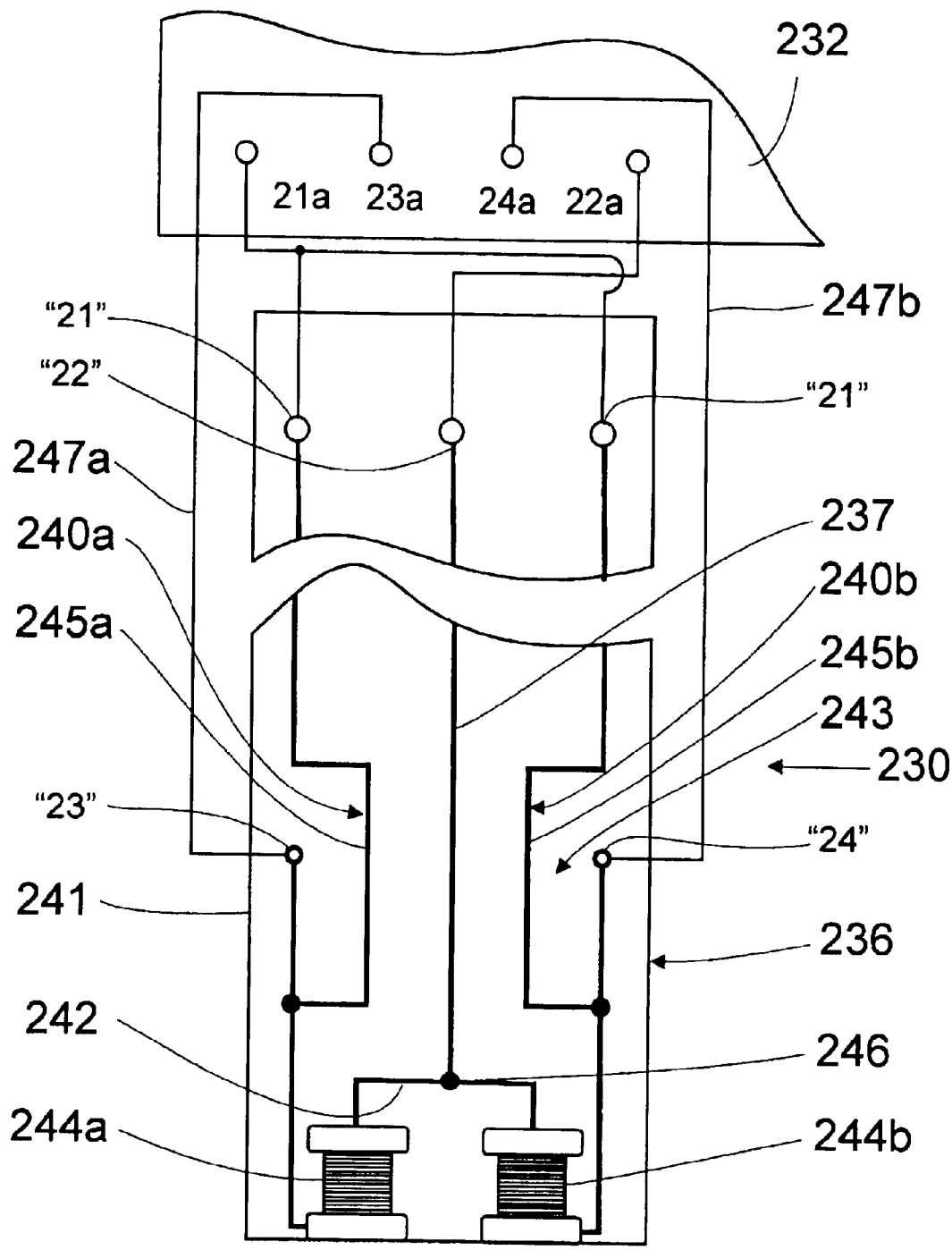
FIG. 9 shows a mounting arrangement of elements in the measurement system made in accordance with a third embodiment of the invention.

FIG. 9 shows a mounting arrangement of elements in the measurement system made in accordance with a third embodiment of the invention. In this embodiment, the measurement system 230 is mounted entirely in a measurement head 236 without the use of the PC boards shown in the previous embodiments. In principle, the system of FIG. 9 is similar to the one shown in FIGS. 5 and 6 and differs from it in that the capacitors 44a and 44b of the circuit of FIGS. 5 and 6 are replaced by a capacitive strip line. More specifically, the system 230 comprises a pair of inductive coils 244a and 244b connected to each other via a connection link 242. The point of symmetry 246 in the connection line 242 is connected to an input terminal "22" of the measurement head 241 by a strip-like conductor 237, which comprises a central part of the aforementioned capacitive strip line 243. This capacitive strip line is formed by two additional conductive strips 245a and 245b that are arranged on both sides of the central wire 237 and form with this central part two symmetrical capacitors 240a and 240b. One ends of the conductive strips 245a and 245b are connected to terminals "23" and "24" of measurement head 236. The terminals "23" and "24" are connected to input useful-voltage-signal terminals 23a and 24a of the impedance analyzer 232 by conductors 247a and 247b. The terminals "23" and "24" are connected also to the front ends of the inductive coils 244a and 244b that are arranged on the side of the measurement head 236 facing the object to be measured (not shown in FIG. 9).

The ends of the conductive strips 245a and 245b of the capacitive strip line 243 which are opposite to the inductive coils 244a and 244b are connected to terminals "21"—"21" of the measurement head 236. Terminals "21"—"21" are connected to each other and to an output RF current terminal 21a of the impedance analyzer 232. The aforementioned terminal 22 of the central conductive strip 237 is connected to the second RF output current terminal 22a of the impedance analyzer 232.

Figure 10:
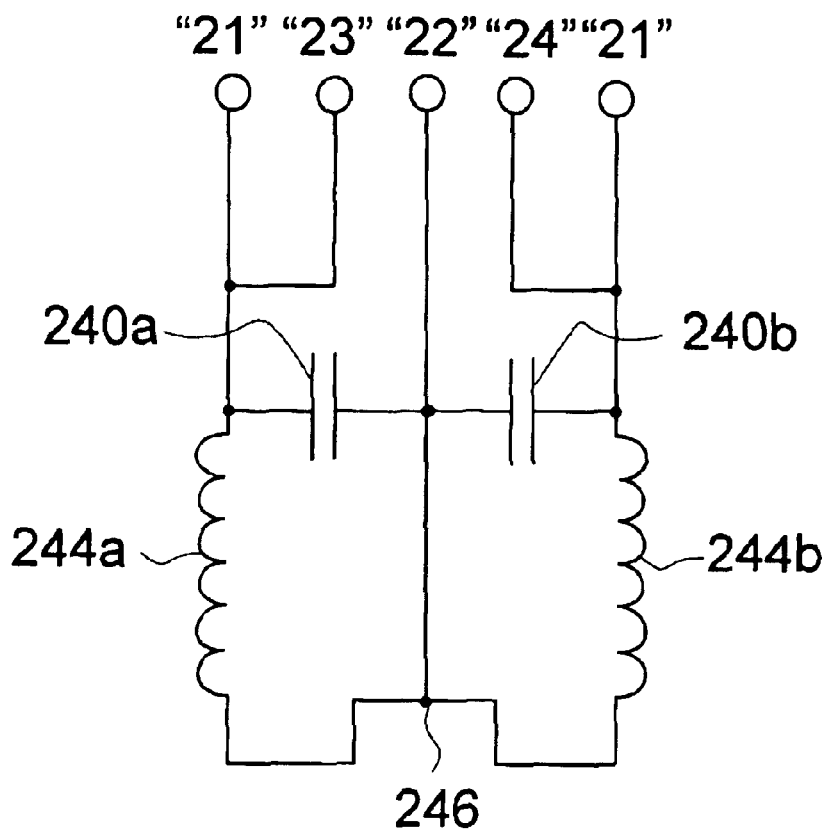
FIG. 10 shows a mounting arrangement of elements in the measurement system made in accordance with a third embodiment of the invention in which the capacitive elements of the oscillation circuits are made as a capacitive strip line.
Figure 11:
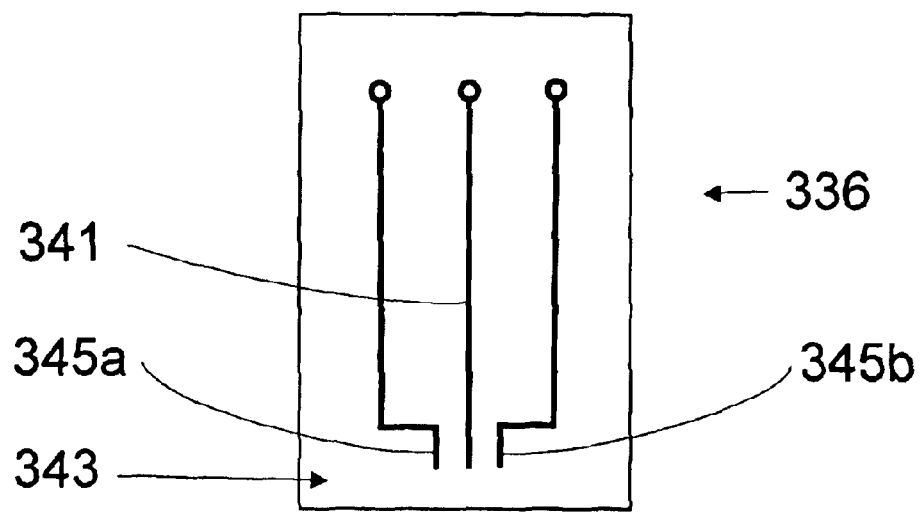
FIG. 11 shows a modified measurement head wherein capacitor chips are replaced by a capacitive strip line.

FIG. 10 illustrates an equivalent circuit of the system of FIG. 9. Reference numerals used in FIG. 10 designates the same circuit elements as shown in FIG. 9. It can be seen that this circuit shown in FIG. 9 is simplified as compared to the one shown in FIGS. 5 and 8 in that it excludes the use of a separate PC board. FIG. 11 shows a modified measurement head 336 of the system embodiment shown in FIG. 8. The only difference of the system of this modification from those described above is that the capacitor chips 140a and 140b are replaced by a capacitive strip line 343 formed by the central conducive strip 341 and side conductive strips 345a and 345b.

Operation

Since the operation principle of the systems of all embodiments is the same, only operation of the embodiment shown in FIGS. 5 and 6 will now be considered in some detail.

Since all the elements of individual oscillation circuits 48a and 48b (FIG. 5) are identical, in an activated state, i.e., when the impedance analyzer 32 is energized, the current is supplied to the oscillations circuit 48a and 48b through the terminals "1" and "2", and the entire measurement system 30 oscillates as a simple single oscillation circuit with a certain resonance frequency $\omega_0$. With the use of the impedance analyzer 32, the aforementioned high frequency $\omega_0$ of the current is selected so that it is equal to the resonance frequency of the aforementioned single oscillation circuit. The voltage that is measured on terminals "3" and "4" in the balanced state of the composite measuring unit 34, i.e., when an object O in the vicinity of the sensor unit is absent, is assumed as a first reference voltage. If the symmetrical elements of the oscillation circuits 48a and 48b have identical characteristics, the aforementioned reference voltage will have a minimal value.

When the measurement head 36 of the system approaches the surface of the object O to be measured, the measurement system 30 forms with the measured object O an object-sensor system with a virtual oscillation circuit induced in the object (in case the material of the object O is metal). If the object O is made of a dielectric material, the proximity of the measurement head 36 will change the distributed capacitance of the sensor elements. In both cases, the resonance frequency $\omega_0$ of the measurement system 30 will be changed relative to the reference voltage. By changing the frequency of the current with the use of the impedance analyzer 32, it is possible to match the frequency of the output frequency on the analyzer with the resonance frequency in the object-sensor system. The voltage signal obtained when the material of the object in the vicinity of the measurement head 36 of the composite measuring unite 34 is uniform and does not have inclusions or defects, is assumed as a second reference voltage. The difference between the first and second reference signals can be related to the target characteristics of the object material such as electrical resistance, film thickness, dielectric constant, etc. This relationship is found and calibration is carried out in the same manner as described in the aforementioned earlier patent applications of the same applicant.

When the surface of the object O is scanned by the composite sensor 30 in a transverse direction shown by the arrow A in FIG. 6 without the change in the gap "d" between the sensor and the surface of the object, in the case of uniformity of the object on the scanned area, the parameters of the resonance will remain unchanged. As soon as the scanned area contains a non-uniformity, such as inclusion E of an impurity (FIG. 6) or changes on the surface, the parameters of the resonance in the object-sensor system will be changed due to change in the capacitive and inductive coupling between one of the inductive coils (i.e., of the coil 40b which is the nearest one to the impurity E) of the measurement head 36 of the composite measurement unite 34 and the impurity E. This change will violate the symmetry in the operation of the individual oscillation circuits 48a and 48b (FIG. 5). This misbalance will be reflected in the voltage input signal of the impedance analyzer 32.

The variation in measured signal can be calibrated in terms of the target parameter or characteristic of the object O, e.g., dimensions of the inclusion, etc. Calibration is carried out by comparison with the results of the same measurement on a test object with known characteristics of non-uniformities.

Such a system makes it possible to detect non-uniformities in a very small areas which in reality will depend on many factors such as the mass of the inclusion, geometry of the inclusion, difference in conductivities or dielectric constants between the matrix material and the inclusion material, etc. The greater is the difference in detectable characteristics of the matrix material and material of the defect or defected area, e.g., void in the metal, metal inclusions in the dielectric matrix, dielectric inclusions in the metal matrix, etc., the higher sensitivity is possible in measurements.

The above operation was described with respect to measurement of defects in a conductive material with an inductive coil sensor (FIGS. 5, 6, 9, and 10). The operation will be the same in the case of the capacitive sensitive elements 140a, 140b, 343 of the measurement heads 136, 336 (FIG. 8, FIG. 11) with the only difference that the prevailing coupling between the sensor and the object in the object-sensor system will be the capacitive coupling. The systems of FIGS. 8 and 11 are more convenient for detecting defects and non-uniformities in the objects from dielectric materials.

The apparatus that can be equipped with the composite measuring unit 34, 134, or measurement head 241 for scanning the objects in the transverse direction A (FIG. 6) is the one shown in FIG. 5 of aforementioned U.S. patent application Ser. No. 10/434625.

The invention also provides a method for measuring non-uniformities in properties and characteristics of an object that may comprise a conductive film and bulk material, the object being a conductive or non-conductive material. The method comprises the steps of: providing a measurement system that comprises a composite measuring unite having a combined oscillation circuit consisting of two identical oscillation circuits, each of said identical oscillation circuits comprising an inductive member and a capacitive member; forming a measurement part of said system of two identical members selected from the group consisting of said inductive member and said capacitive member; activating said combined sensor in the absence of the object in the vicinity of the combined sensor from a source of a high-frequency current so that said combined oscillation circuit begins to operate on a certain resonance frequency; assuming said certain resonance frequency and a voltage measured in said combined oscillation circuit as a first reference; approaching said two identical members towards said object until interaction occurs between said measurement system and said object; measuring the distance between said measurement system and the surface of said object and measuring changes in said first reference; assuming the changed value of said first reference as a second reference; scanning the surface of said object with said measurement system in the direction parallel to the surface of said object while maintaining said distance constant; detecting any changes that occur in said second reference under the effect of said non-uniformities; and measuring said non-uniformities by comparing the results of measurement with those obtained in measuring a reference object with known characteristics of non-uniformities.

Thus it has been shown that the present invention provides a universal electromagnetic resonance sensor for detecting and measuring local non-uniformities and a method for measuring non-uniformities in properties and characteristics of films and bulk materials by RST not only in the depth but also in the lateral direction. The invention provides the aforementioned method and system that are capable of detecting non-uniformities on the areas smaller than 1/10 of the cross-sectional area of the measuring coil or capacitor chip. Still another object is to provide the aforementioned system the construction of which is based on new combinations of the same measurement elements as the previous RST systems.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For examples, impedance analyzers other than the one described in the specification can be used. The impedance analyzer can be replaced by a transformer bridge. The circuit elements of the measurement system may have structures and arrangements different from those shown and described in the drawings and specification. All parts of the measuring unit can be mounted on a single substrate. Inductance members also may have strip line structures. All the elements of the circuit can be designed and operate on the basis of MEMS technology. The number of measurement elements, i.e., inductive coils or capacitor chips may be more than two and they may have different geometrical orientation with respect to each other.

What is claimed is:

1. A method for measuring non-uniformities in properties and characteristics of an object that has a surface and may have non-uniformities, said method comprising the steps of:

providing a universal electromagnetic resonance measurement system for detecting and measuring local non-uniformities in said object that comprises a combined sensor having a combined oscillation circuit comprising a first oscillation circuit and a second oscillation circuit which are identical, said first oscillation circuit comprising a first inductive member and a first capacitive member, said second oscillation circuit comprising a second inductive member and a second capacitive member, said first inductive member and said second inductive member being identical, said first capacitive member and said second capacitive member being identical;

providing a reference object with known characteristics of non-uniformities;

forming a measurement part of said universal electromagnetic resonance measurement system of two identical members selected from the group consisting of said first inductive member, said second inductive member, said first capacitive member, and said second capacitive member;

activating said combined sensor in the absence of said object in the vicinity of said combined sensor from a source of a high-frequency current so that said combined oscillation circuit begins to operate on a certain resonance frequency;

measuring said certain resonance frequency and a voltage in said combined resonance circuit;

assuming said certain resonance frequency and said voltage measured in said combined resonance circuit as a first reference;

approaching said two identical members towards said object until interaction occurs between said universal electromagnetic resonance measurement system and said object;

measuring a distance between said universal electromagnetic resonance measurement system and the surface of said object and measuring changes in said first reference;

measuring a changed value of said first reference;

assuming said changed value of said first reference as a second reference;

scanning the surface of said object with said universal electromagnetic resonance measurement system in a direction parallel to the surface of said object while maintaining said distance constant;

detecting any changes that occur in said second reference under the effect of said non-uniformities; and measuring said non-uniformities by comparing the results of measurement with those obtained in measuring said reference object with known characteristics of non-uniformities.

2. The method of claim 1, wherein said object is selected from the group of bulk materials and films on substrates, wherein said bulk materials and said films on substrates are selected from the group consisting of conductive materials, non-conductive materials, and semiconductors.

3. The method of claim 2, comprising the steps of using said identical members as inductive coils when said object comprises a conductive material and as capacitors when said object is a non-conductive material.

4. The method of claim 1, wherein said high-frequency current is within the range from 1 to 1000 MHz.

5. The method of claim 3, wherein said high-frequency current is within the range from 1 to 1000 MHz.

6. A universal electromagnetic resonance measurement system for measuring non-uniformities in an object, said universal electromagnetic resonance measurement system comprising:

a combined sensor having a combined oscillation circuit for detecting and measuring local non-uniformities in said object comprising a first oscillation circuit and a second oscillation circuit which are identical, said first oscillation circuit comprising a first inductive member and a first capacitive member, said second oscillation circuit comprising a second inductive member and a second capacitive member, said first inductive member and said second inductive member being identical, said first capacitive member and said second capacitive member being identical;

a measurement part comprising two identical members selected from the group consisting of said first inductive member, said first capacitive member, said second inductive member, and said second capacitive member; and a current supply and voltage measuring means comprising: a source of high frequency current connected to said combined sensor; and a voltage meter for measuring a voltage signal in said combined oscillation circuit.

7. The system of claim 6, wherein said first inductive member and said second inductive member are inductive coils.

8. The system of claim 6, wherein said first capacitive member and said second capacitive member are selected from the group consisting of a capacitor chip and a capacitive strip line.

9. The system of claim 6, wherein said high-frequency current is within the range from 1 to 1000 MHz.

10. The system of claim 7, wherein said high-frequency current is within the range from 1 to 1000 MHz.

11. The system of claim 8, wherein said high-frequency current is within the range from 1 to 1000 MHz.

12. The apparatus of claim 6, wherein said current supply and voltage measuring means comprises an RF impedance analyzer.

13. The apparatus of claim 7, wherein said current supply and voltage measuring means comprises an RF impedance analyzer.

14. The apparatus of claim 8, wherein said current supply and voltage measuring means comprises an RF impedance analyzer.

15. The apparatus of claim 11, wherein said current supply and voltage measuring means comprises an RF impedance analyzer.

16. The apparatus of claim 9, wherein said current supply and voltage measuring means comprises an RF impedance analyzer.

17. The apparatus of claim 10, wherein said current supply and voltage measuring means comprises an RF impedance analyzer.

* * * * *